Patented Feb. 20, 1951

2,542,641

UNITED STATES PATENT OFFICE 2,542,641

PREPARATION OF POLYSILOXANE RESINS

Charles D. Doyle, Schenectady, N. Y., assignor to General Electric Company, a corporation of New York No Drawing. Application August 7, 1947, Serial No. 767,342

8 Claims. (Cl. 260—46.5)

This invention is concerned with a method of preparing polysiloxane resins. More particularly, the invention is concerned with an improved process of effecting an hydrolysis reaction of a mass comprising a monohydrocarbon-substituted trihalogenosilane which process comprises treating the said mass with a tertiary saturated aliphatic alcohol containing from 4 to 6 carbon atoms (e. g., tertiary butyl alcohol, tertiary amyl alcohol, tertiary hexyl alcohol, isomers of these alcohols, and mixtures thereof) while the said halogenosilane mass is dissolved in a polyether solvent selected from the class consisting of dioxane, lower dialkyl ethers of ethylene glycol, lower dialkyl ethers of diethylene glycol, and mixtures thereof.

It is well known that organohalogenosilanes or mixtures thereof, which may also contain some silicon tetrahalide, hydrolyze readily when mixed with water to form silanols which condense or can be caused to condense to form polysiloxanes. The ease with which the silanols condense is dependent on the nature of the organic radical or radicals attached to the silicon atom. When all or substantially all of these radicals are methyl groups the rate of dehydration or condensation is so rapid that the condensation of the silanols occurs almost simultaneously with the hydrolysis of the methylhalogenosilanes. Such rapid hydrolysis results either in the formation of insoluble gels which cannot be used in the manufacture of useful resinous compositions, or in the formation of products of low average molecular weight rather than the soluble high average molecular weight products sought in the preparation of resinous products in general.

Several methods have been suggested for overcoming the defects discussed above. For example, in Sauer Patent 2,398,672, issued April 16, 1946, and assigned to the same assignee as the present invention, there is disclosed and claimed a process for effecting hydrolysis of a mixture comprising a hydrocarbon-substituted chlorosilane dissolved in a suitable solvent such as toluene. The water of hydrolysis is added to the chlorosilane mixture in the form of a solution comprising the water and a higher alcohol such as butanol. This process has certain disadvantages among them being the requirement of unusually large volumes of water and solvents, difficulty in separating the solvents, etc. Moreover, resins obtained by means of this process possess inferior craze resistance and alkali resistance, and, in addition, the viscosity of such resins is so low as to require heating of the resin for extended periods of time to body the resin to a suitable viscosity.

Another process for effecting hydrolysis of halogenosilanes is more particularly disclosed and claimed in Sprung Patent 2,383,827, issued August 28, 1945, and assigned to the same assignee as the present invention. This patent discloses hydrolyzing a mixture of organohalogenosilanes by slowly adding a solution of the latter in toluene to a mixture of water, toluene and an alcohol, for example, tertiary amyl alcohol. The resinous product obtained thereby is thereafter heated with a catalyst, for example, hydrated ferric chloride or antimony pentachloride, under partial distillation conditions until a resin of the proper viscosity is obtained. However, this method of hydrolysis also has its disadvantages. For example, the acid resistance of resins prepared in accordance with this process is inferior. In addition, the viscosity of such resins, although better than the viscosity of resins prepared by the Sauer process, is still quite low. Moreover, when these resins are compounded with pigments and employed in coating applications, there is a marked decrease in the gloss of said coating compositions as compared to, for example, the gloss of coating compositions comprising resins prepared by the Sauer method.

The present invention is based on the discovery that improved polysiloxane resins can be obtained by treating, in the absence of water, a mass comprising a hydrocarbon-substituted halogenosilane with a tertiary saturated aliphatic (alkyl) alcohol containing from 4 to 6 carbon atoms while the said halogenosilane mass is dissolved in a solvent selected from the class of solvents described in the first paragraph of this application. No added water, in any form, is necessary for practicing my invention. It is essential that tertiary alcohols containing from 4 to 6 carbon atoms be employed to obtain the results accomplished by my process. Primary and secondary alcohols are ineffective in my process.

By means of my invention I am able to obtain resins of substantially higher viscosity than has hereto been possible by usual methods of hydrolysis, and, in addition, the craze resistance, alkali resistance, acid resistance, gloss, and color of these resins are consistently good and in some cases better than many of the resins prepared in accordance with prior known processes.

It is not clearly understood how my process effects the aforementioned desirable results. However, it is believed that reaction between the halogen of the hydrocarbon-substituted halogenosilane and the tertiary alcohol results in the release of small amounts of hydrogen halide which in turn react with additional amounts of the tertiary alcohol to give the particular tertiary alkyl halide and a small amount of water which results in hydrolysis of the halogenosilane. It is, therefore, believed that a true hydrolysis occurs in my claimed process. By means of this controlled release of water, it is possible to obtain higher molecular weight condensation products without apparent gelation of any portions of the said condensation products, while at the same time imparting to the resin the desirable properties described previously.

Optimum results are obtained when the mass comprising the hydrocarbon-substituted halogenosilane and containing a monohydrocarbon-substituted trihalogenosilane is dissolved in a polyether solvent, for example, dioxane, lower dialkyl ethers of ethylene glycol, for example, dimethyl ether of ethylene glycol, diethyl ether of ethylene glycol, di-isopropyl ether of ethylene glycol, dibutyl ether of ethylene glycol, etc., lower dialkyl ethers of diethylene glycol, for example, dimethyl ether of diethylene glycol, diethyl ether of diethylene glycol, etc., and mixtures thereof.

The invention is particularly concerned with the formation of methyl-substituted polysiloxanes and mixed methyl- and phenyl-substituted polysiloxanes from methylchlorosilanes and from mixtures of methylchlorosilanes and phenylchlorosilanes containing a monohydrocarbon-substituted chlorosilane wherein the hydrocarbon-to-silicon ratio is from 1 to 1.5. The invention is especially directed to chlorosilane mixtures having a hydrocarbon-to-silicon ratio of from 1 to 1.5 and containing from 10 to 50 mol per cent methyltrichlorosilane, from 10 to 60 mole per cent phenyltrichlorosilane, and from 20 to 50 mol per cent dimethyldichlorosilane, the total mol per cent being equal to 100 per cent. In the preferred embodiments of this invention, where chlorosilane mixtures are employed, the total mol per cent of the monohydrocarbon-substituted trihalogenosilane comprises from 50 to 75 mol per cent.

The method whereby polysiloxane resins may be prepared in accordance with my process may be carried out in several ways. One method comprises preparing a solution of a mass comprising a monohydrocarbon-substituted trihalogenosilane and a polyether solvent of the class disclosed previously. The proportion of chlorosilane to polyether solvent is not critical and may be varied within wide limits. Good results are obtained when the hydrocarbon-substituted halogenosilane mass comprises from 40 to 80 per cent, by weight, of the total weight of the solution.

Thereafter, the tertiary alkyl alcohol is advantageously added in portions sufficiently small to preclude too high a rise in temperature and consequent violent gas evolution, and undesirable side reactions. For this purpose, I have found it expedient to allow from 50 to 60 per cent of the stoichiometric requirement of the alcohol to react with the halogenosilane mixture prior to addition of the remainder of the required amount of tertiary alcohol. After addition of the tertiary alcohol, the reaction temperature may rise from slightly above normal temperatures (about 25° C.) to as high as 50° to 65° C.

The amount of tertiary alcohol added may be varied within wide ranges depending upon the degree of hydrolysis desired. For complete hydrolysis, I may employ from about 100 to 120 per cent, preferably from 105 to 115 per cent, of the stoichiometric requirements of the alcohol based on the number of halogens in the mass containing the hydrocarbon-substituted halogenosilane. Although greater amounts of the alcohol are not precluded, I have found that complete conversion of the halogenosilanes takes place within the above stoichiometric limits, since condensation of the silanols, i. e., hydrocarbon-substituted silanols formed in the course of the reaction, is essentially complete.

Thus, taking an example where the hydrocarbon-to-silicon ratio of a mixture of hydrocarbon-substituted chlorosilanes is from 1 to 1.5, it will be apparent that the following equation covers the particular case where $n=1$ to 1.5

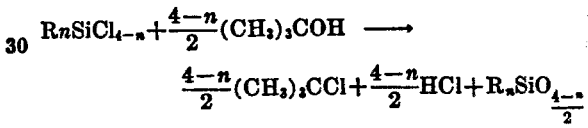

For each atom of chlorine attached to a silicon atom there may be present at least one-half mol of tertiary butyl alcohol. Basing the stoichiometric requirements on the aforementioned formula, one can calculate easily the case where 120 per cent (i. e., a 20 per cent excess) of the stoichiometric amount of butyl alcohol is desired.

After addition of all the tertiary alcohol, it may be desirable, though not necessary, to add a small amount of water to the mixture to act as a halogen "scavenger" for the purpose of effecting hydrolysis of any unhydrolyzed silicon-bonded halogen. The total charge is then preferably strip-distilled or heated to a temperature of about 180° C. to remove all volatile materials boiling below 180° C. including the polyether solvent, any hydrogen halide present, tertiary alkyl halide of the tertiary alcohol, etc. The isolated resin thus obtained, if desired, may then be dissolved in various solvents, for instance, petroleum spirits, xylene, toluene, etc., or mixtures thereof, to make varnishes therefrom.

If desired, the reaction between the halogenosilane and the tertiary alcohol may be effected in steps. Where hydrocarbon-substituted halogenosilanes of different activity are employed, for example, methylchlorosilanes and phenylchlorosilane, the less reactive halogenosilane, e. g., the phenylchlorosilane, may be dissolved in the particular polyether solvent employed and caused to react with the tertiary alkyl alcohol separately. Thereafter, the more reactive hydrocarbon-substituted halogenosilane, e. g., the methylchlorosilane, is added to the first reaction product together with an additional amount of the polyether solvent, and an additional sufficient amount of tertiary alcohol is reacted therewith to complete the conversion of the halogenosilanes to polysiloxanes.

In order that those skilled in the art may better understand how my claimed invention may be practiced, the following examples are given by way of illustration and not by way of limitation.

*Example 1*

A mixture containing 20 mol per cent methyltrichlorosilane, 40 mol per cent phenyltrichlorosilane, and 40 mol per cent dimethyldichlorosilane was converted to a polysiloxane resin by the following procedure.

About 509 grams phenyltrichlorosilane, 255 grams diethyl ether of ethylene glycol $(H_5C_2—O—CH_2CH_2—O—C_2H_5)$, and 134 grams tertiary butyl alcohol were stirred under autogenous reflux conditions in a reaction vessel vented to an HCl absorber until the reaction temperature reached a maximum of about 40 to 50° C. (approximately 2 hours). Thereafter, 199.5 grams of methyltrichlorosilane containing about 9.7 mol per cent dimethyldichlorosilane was added to the mixture followed by 370 grams diethyl ether of ethylene glycol and 58.8 grams tertiary butyl alcohol. When the reaction temperature again reached a maximum in about 2 hours, 291.5 grams dimethyldichlorosilane followed by 146 grams diethyl ether of ethylene glycol and 119.8 grams tertiary butyl alcohol were added. The reaction temperature reached a maximum in approximately 1 hour at which time 268.4 grams tertiary butyl alcohol was added and the mixture allowed to reflux under its own heat of reaction for about 45 minutes. About 14.1 grams of water was added slowly to the reaction mixture as a chlorine "scavenger." The total mixture was rapidly strip-distilled to 180° C. to remove all the solvent and by-products resulting from the reaction, for example, hydrogen chloride, tertiary butyl chloride, residual tertiary buty alcohol etc. Thereafter, the residual resin was dissolved in xylene to make a resin solution containing 60 per cent solids. This resin solution was treated with carbon black to remove any impurities, and then filtered through diatomaceous earth.

*Example 2*

In this example, the mixture of hydrocarbon-substituted chlorosilanes was reacted simultaneously with the tertiary butyl alcohol in contrast to the step-wise addition described in Example 1. More particularly, a blend of 509 grams phenyltrichlorosilane, 180 grams methyltrichlorosilane containing about 9.7 mol per cent dimethyldichlorosilane, and 311 grams dimethyldichlorosilane were stirred thoroughly with 771 grams diethyl ether of ethylene glycol and 349 grams tertiary butyl alcohol for 3 hours under autogenous reflux conditions while the reaction vessel in which the reaction was conducted was vented to a hydrochloric acid absorber. Thereafter, 232 grams of additional tertiary butyl alcohol was added and stirred under the conditions described above. About 14.1 grams water was slowly added to "scavenge" for chlorine. The reaction mass was then rapidly strip-distilled to about 180° C. to remove the solvent, HCl, any residual tertiary butyl alcohol, tertiary butyl chloride, and any other products formed or present in the reaction mass. The residue, which was virtually 100 per cent resin, was dissolved in petroleum spirits, washed with water, dried and adjusted with petroleum spirits to 60 per cent solids.

*Example 3*

In this example, a polysiloxane resin was prepared in the same manner as in Example 2 with the exception that 415 grams tertiary amyl alcohol was employed in place of the first portion of 349 grams tertiary butyl alcohol, and 276 grams tertiary amyl alcohol was used instead of the second portion of 232 grams tertiary butyl alcohol. The chlorosilane composition, method of preparation of the resin, and solvent were identical with those used in the aforementioned Example 2.

*Example 4*

For comparison purposes, two resins were prepared using the processes disclosed in the aforementioned U. S. Patents 2,398,672 and 2,383,827.

(a) In accordance with the method disclosed in U. S. Patent 2,398,672, 500 grams of a chlorosilane blend consisting of 20 mol per cent methyltrichlorosilane, 40 mol per cent phenyltrichlorosilane, and 40 mol per cent dimethyldichlorosilane was mixed with 167 grams toluene and slowly added to a stirred mixture of 167 grams toluene, 333 grams n-butanol and 1665 grams water. The resin layer was water washed until neutral, dried, and adjusted to 60 per cent solids with toluene as the solvent.

(b) Using the method described in U. S. Patent 2,383,827, 500 grams of the chlorosilane blend employed in (a) above was mixed with 167 grams toluene and slowly added to a stirred mixture of 167 grams toluene, 333 grams tertiary amyl alcohol and 1665 grams water. The resin layer was water-washed until neutral, adjusted to 30 per cent solids with toluene and refluxed for 2 hours with 5 per cent antimony pentachloride and 3 per cent ferric chloride hexahydrate, based on the weight of the resin. The stirred mixture was partially distilled to 100° C. vapor temperature, washed, until neutral, and adjusted to 60 per cent solids with toluene.

Samples of each of the resins prepared in Examples 1 to 4 were mixed with 18 per cent, by volume, of a pigment consisting of titanium dioxide in a pebble mill and ground for 48 hours. Each of the enamels thus formed was applied with a 3-mil applicator to glass panels and baked one hour at 200° C. The gloss of each panel was measured directly by an electrical photometric method, the results of which are given below in per cent gloss.

Samples of each of the above resin enamels were applied to 6-inch glass tubes with a spray gun giving a 1 to 1½ mil dry-film thickness and the samples baked at 200° C. for 1 hour. The tubes were suspended in either a 5 per cent aqueous sodium hydroxide solution or a 5 per cent aqueous sulphuric acid solution for 100 hours at room temperature to determine the effect of the alkali or acid on the enamel. During this time, the samples were examined periodically.

The heat resistance or craze life of the enamels was tested as follows. Each of the enamels was applied with a spray gun to cold roll steel panels giving a dry-film thickness of 1 to 1½ mil and the panels baked at 200° C. for 1 hour. The coated panels were placed in a 260° C. oven and examined periodically at 24 hours, 48 hours, 100 hours and 500 hours to determine whether crazing had resulted. Prior to pigmentation, each of the clear resin solutions (which had identical solids contents) was tested for color on the Gardner Scale and for viscosity in accordance with the Gardner-Holdt method.

Following are the results of the various tests described above. The designation "+" after a value indicates that the sample was unaffected by the particular test at the end of the specified time.

| | Resin Example 1 | Resin Example 2 | Resin Example 3 | Resin Example 4a | Resin Example 4b |
|---|---|---|---|---|---|
| Color | 2 | 4 | 4 | 1 | 18. |
| Viscosity | 65 cp | 65 cp | 60 cp | 1 cp | 22 cp. |
| Gloss | 85% | 87% | 84% | 84% | 53%. |
| Hardness (Sward Rocker Method) | 52 | 52 | 50 | 48 | 48. |
| Alkali resistance | 100 hrs.+ | 100 hrs.+ | 100 hrs.+ | Badly attacked in 48 hours. | 100 hrs.+ |
| Heat resistance (craze life 260° C.) | 500 hrs.+ | 500 hrs.+ | 500 hrs.+ | Crazed in 48 hrs. | 500 hrs.+ |
| Acid resistance | 100 hrs.+ | 100 hrs.+ | 100 hrs.+ | 100 hrs.+ | Badly attacked in 72 hours. |

From the results of the above tests, it will be apparent that the viscosity of resins made in accordance with my process are greater than those prepared in accordance with other methods disclosed previously. Furthermore, my process for making polysiloxane resins imparts consistently superior gloss, alkali resistance, acid resistance, and heat resistance properties as compared to the resins made in accordance with the processes described in the two previously mentioned patents.

In addition to the preparation of polysiloxane resins from the particular blend of hydrocarbon-substituted chlorosilanes employed in the foregoing examples, it will be apparent that my invention may also be applied to other hydrocarbon-substituted halogenosilanes and mixtures thereof containing a monohydrocarbon-substituted trihalogenosilane. Additional examples of such halogenosilanes are, for instance, methyltribromosilane, trimethylchlorosilane, dimethyldibromosilane, ethyltrichlorosilane, diethyldichlorosilane, dipropyldichlorosilane, isoamyltrichlorosilane, allyltrichlorosilane, diphenyldibromosilane, naphthyltrichlorosilane, dibenzyldichlorosilane, ditolyldibromosilane, tolyltrichlorosilane, etc.

The polysiloxane resins prepared in accordance with my claimed process may be mixed with fillers, cure accelerators, etc., and molded under heat and pressure to form useful compositions of matter. The resins, in the form of liquid solutions, may be used to coat and impregnate sheets of cloth, paper, etc., which can be employed to make laminated articles.

What I claim as new and desire to secure by Letters Patent of the United States is:

1. The process of preparing resinous polysiloxanes which comprises (1) forming a solution substantially free of water and comprising (a) a mixture of hydrocarbon-substituted chlorosilanes having a hydrocarbon-to-silicon ratio of from 1 to 1.5 and containing a major proportion, by weight, of a monohydrocarbon-substituted trichlorosilane including methyl trichlorosilane and phenyltrichlorosilane, (b) a solvent for (a) comprising diethyl ether of ethylene glycol, and (c) tertiary butyl alcohol, the latter being employed in an amount equal to at least 100 per cent of the stoichiometric amount required for essentially complete hydrolysis of the silicon-bonded chlorine atoms in the mass containing the hydrocarbon-substituted chlorosilanes, (2) vigorously agitating the said solution while maintaining refluxing of the solution, and (3) removing the volatile material boiling below 180° C.

2. The process of preparing resinous polysiloxanes which comprises (1) forming a solution substantially free of water and comprising (a) a mixture of hydrocarbon-substituted chlorosilanes having a hydrocarbon-to-silicon ratio of from 1 to 1.5 and containing from 10 to 50 mol per cent methyltrichlorosilane, from 10 to 60 mol per cent phenyltrichlorosilane and from 20 to 50 mol per cent dimethyldichlorosilane, (b) a solvent for (a) comprising diethyl ether of ethylene glycol and (c) tertiary butyl alcohol, the latter being employed in an amount equal to at least 100 per cent of the stoichiometric amount required for essentially complete hydrolysis of the silicon-bonded chlorine atoms in the mass containing the hydrocarbon-substituted chlorosilanes, (2) vigorously agitating the aforementioned solution while maintaining autogenous refluxing of the solution, (3) adding a small amount of water to the agitated mixture of (2), and (4) removing the volatile material boiling below 180° C.

3. The process of preparing resinous polysiloxanes which comprises (1) reacting in the absence of water a mass comprising a hydrocarbon-substituted halogenosilane and containing a monohydrocarbon-substituted trihalogenosilane with a tertiary saturated aliphatic alcohol containing from 4 to 6 carbon atoms, the said halogenosilane mass being dissolved in a polyether solvent selected from the class consisting of dioxane, lower dialkyl ethers of ethylene glycol, lower dialkyl ethers of diethylene glycol, and mixtures thereof, and the aforesaid tertiary alcohol being employed in an amount equal to at least 100% of the stoichiometric amount required for essentially complete hydrolysis of silicon-bonded halogens in the mass containing the hydrocarbon-substituted halogenosilane, and (2) separating the resultant organosiloxane.

4. The process of preparing resinous polysiloxanes which comprises (1) forming a solution comprising (a) a hydrocarbon-substituted trichlorosilane and (b) a polyether solvent selected from the class consisting of dioxane, lower dialkyl ethers of ethylene glycol, lower dialkyl ethers of diethylene glycol, and mixtures thereof, (2) reacting the solution obtained in (1) in the absence of water with a tertiary saturated aliphatic alcohol containing from 4 to 6 carbon atoms and which is present in an amount equal to at least 100% of the stoichiometric amount required for essentially complete hydrolysis of the silicon-bonded chlorine atoms in the mass containing the hydrocarbon-substituted trichlorosilane, and (3) separating the resultant organosiloxane.

5. The process of preparing resinous polysiloxanes which comprises (1) forming a solution comprising (a) a mixture of hydrocarbon-substituted chlorosilanes having a hydrocarbon-to-silicon ratio of from 1 to 1.5 and containing methyltrichlorosilane and dimethyldichlorosilane and (b) a polyether solvent selected from the class consisting of dioxane, lower dialkyl ethers of ethylene glycol, lower dialkyl ethers of diethylene glycol, and mixtures thereof, (2) reacting the solution of (1) in the absence of water with tertiary butyl alcohol, the latter being employed in an amount equal to at least 100% of the stoichiometric amount required for essentially complete hydrolysis of the silicon-bonded chlorine atoms in the mass containing the hydrocarbon-substituted chlorosilanes, and (3) separating the resultant organosiloxane.

6. The process of preparing polysiloxane resins which comprises (1) forming a solution comprising (a) a mixture of hydrocarbon-substituted chlorosilanes having a hydrocarbon-to-silicon ratio of from 1 to 1.5 and containing methyltrichlorosilane, dimethyldichlorosilane, and phenyltrichlorosilane, and (b) a polyether solvent selected from the class consisting of dioxane, lower dialkyl ethers of ethylene glycol, lower dialkyl ethers of diethylene glycol, and mixtures thereof, (2) reacting the solution of (1) in the absence of water with tertiary amyl alcohol, the latter being employed in an amount equal to at least 100% of the stoichiometric amount required for essentially complete hydrolysis of the silicon-bonded chlorine atoms in the mass containing the hydrocarbon-substituted chlorosilanes, and (3) separating the resultant organosiloxane.

7. The process of preparing resinous polysiloxanes which comprises (1) forming a solution comprising (a) a mixture of hydrocarbon-substituted chlorosilanes having a hydrocarbon-to-silicon ratio of from 1 to 1.5 and containing a major proportion, by weight, of a monohydrocarbon-substituted trichlorosilane and (b) diethyl ether of ethylene glycol, (2) reacting the solution of (1) in the absence of water with tertiary butyl alcohol, the latter being employed in an amount equal to at least 100% of the stoichiometric amount required for essentially complete hydrolysis of the silicon-bonded chlorine atoms in the mass containing the hydrocarbon-substituted chlorosilanes, and (3) separating the resultant organosiloxane.

8. The process of preparing resinous polysiloxanes which comprises (1) forming a solution comprising (a) a mixture of hydrocarbon-substituted chlorosilanes having a hydrocarbon-to-silicon ratio of from 1 to 1.5 and containing a major proportion, by weight, of a monohydrocarbon-substituted trichlorosilane and (b) diethyl ether of ethylene glycol, (2) reacting the solution of (1) in the absence of water with tertiary amyl alcohol, the latter being employed in an amount equal to at least 100% of the stoichiometric amount required for essentially complete hydrolysis of the silicon-bonded chlorine atoms in the mass containing the hydrocarbon-substituted chlorosilanes, and (3) separating the resultant organosiloxane.

CHARLES D. DOYLE.

REFERENCES CITED

The following references are of record in the file of this patent:

UNITED STATES PATENTS

| Number | Name | Date |
| --- | --- | --- |
| 2,398,672 | Sauer | Apr. 16, 1946 |
| 2,438,520 | Robie et al. | Mar. 30, 1948 |
| 2,450,594 | Hyde | Oct. 5, 1948 |
| 2,456,627 | Doyle | Dec. 21, 1948 |
| 2,521,673 | Britton et al. | Sept. 12, 1950 |

OTHER REFERENCES

Sauer: Journ. Amer. Chem. Soc., Jan. 1946.